Patented May 30, 1944

2,350,127

UNITED STATES PATENT OFFICE 2,350,127

METHOD OF FORMING SULPHONIC ACID CHLORIDES OF COUPLERS

Henry Dudley Porter and Arnold Weissberger, Rochester, N. Y., assignors to Eastman Kodak Company, Rochester, N. Y., a corporation of New Jersey No Drawing. Application September 26, 1940, Serial No. 358,494. In Great Britain January 3, 1940

6 Claims. (Cl. 260—346)

This invention relates to a method of preparing intermediates used for the production of color forming compounds for color photography.

It is known that colored photographic images may be formed by using a developer which forms a colored compound on development, and that the colored compound thus formed is deposited adjacent to the silver grains of the silver image during the development. It is also known that a colored image may be formed by adding to certain developer solutions or by incorporating in the gelatino-silver-halide emulsion before or after exposure, a compound which couples during development with the oxidation product of the developing agent and forms a coloring substance which is likewise deposited adjacent to the silver grains of the silver image during development. Such a compound, which is employed in conjunction with a developing agent for the silver and which couples with the oxidation product thereof during development, is referred to herein as a coupling component or coupler.

Coupling components are reacted with the development product of primary aromatic amino developing agents by reason of a "coupling function" which is a functional or reactive group common to these compounds. This reactive group takes the form of a reactive methylene or reactive ethenol group. A "reactive methylene" group is a $CH_2$ group which is reactive in the coupling process. The $CH_2$ group is usually present between two negative centers as in the groups —CO—$CH_2$—CO— or —CO—$CH_2$—CN. One of the hydrogen atoms of the methylene group may, in general, be substituted without destroying the chemical activity of the group. A "reactive ethenol" group is the group

as in the phenolic and naphtholic coupler compounds which are presumably active in the ortho or para position with respect to the position of the hydroxyl group.

Sulphonic acid chlorides of couplers are of considerable importance in color photography since they react easily with ammonia or with amines, forming sulphonamines, and with compounds containing hydroxyl groups, forming esters. The reaction products obtained in this way may be used in color developers or they may be incorporated in photographic emulsions if the attached amine or alcohol is of such a nature that the molecule of the coupler is non-diffusing in the emulsion. Non-diffusing couplers may be made by reacting the sulphonic acid chlorides with high molecular substances containing amino or hydroxyl groups, such as gelatin, cellulose, and synthetic resins such as polyaminostyrene, polyhydroxystyrene and polyvinyl alcohol.

The preparation of sulphonic acid chlorides of aromatic compounds by reaction of the aromatic compound with chlorosulphonic acid is well known (Smiles & Stewart "Organic Syntheses" collective vol. I, page 8 (1932), published by John Wiley & Son). However, the sulphonyl chlorides of couplers have not been prepared by this or any other method. The references in the literature (Chem. Abst. 23, 3205[2] (1929), Chem. Abst. 24, 4508[3] (1931), German Patent 685,361, 1939) to the reaction of chlorosulphonic acid with active methylene compounds, show that the methylene group has been substituted, which is not the case in the present invention.

It is, therefore, an object of the present invention to provide a method for reacting chlorosulphonic acid with compounds containing a reactive methylene group. A further object is to provide novel coupler intermediates for color photography. Other objects will appear from the following description of our invention.

These objects are accomplished by reacting an aromatic compound containing a reactive methylene group with chlorosulphonic acid at low temperature and limiting the time of reaction to the order of a few days.

The couplers which may be treated according to our invention include acyl-acetanilides such as aceto-acetanilide, benzoyl-acetanilide and anisoyl-acetanilide, cyano-acetyl compounds, such as cyano-acetyl-naphthalene, cyano-acetyl-coumarone, etc. These compounds are treated with an excess of chlorosulphonic acid while keeping the temperature of the reaction mixture below about 10° C. The reaction time is limited, the reaction being allowed to proceed for about a day or two. The reaction is then terminated and it is found that this procedure introduces a sulphonyl chloride group into the aromatic ring portion of the molecule without affecting the reactive methylene group.

The following examples, which are illustrative only, indicate the method of forming sulphonic acid chlorides of typical couplers according to our method.

EXAMPLE 1.—*2-cyanoacetylnaphthalene-x-sulphonyl chloride*

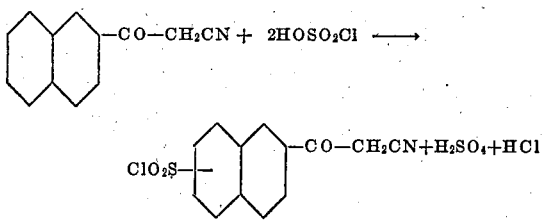

In a 3-liter, three-necked flask, fitted with an efficient mechanical stirrer and a thermometer, is placed 1250 cc. (about 19 moles) of chlorosulphonic acid. The flask is cooled in an ice bath until the temperature of the acid is about 5° C., and 500 g. (2.56 moles) of 2-cyanoacetyl naphthalene is added slowly, in small portions, and with vigorous stirring. The rate of addition should be such that the temperature is maintained at 10–15°; about 45 minutes is required. When all the coupler has been added, the mixture is stirred at 10°–15° for 1–2 hours and is then left standing at room temperature for 60–65 hours, the flask being protected during this time by means of a calcium chloride tube. The excess acid is then decomposed by running the solution in a rapid stream from a dropping funnel, with vigorous mechanical stirring, into a mixture of 10 kg. of crushed ice and 1 liter of concentrated hydrochloric acid. After it has stood for 10–15 minutes, the light-yellow acid liquor is decanted from the crude sulfonyl chloride, which forms a single sticky mass on the bottom of the flask. It should not be attempted to collect the solid on a filter.

The moist, sticky solid is dissolved in 6 liters of chloroform, the solution filtered through flannel on a 12-inch Buchner funnel, and then vigorously stirred for a few minutes with 5 liters of cold water. After the two layers have separated, the chloroform solution is siphoned off and washed twice more in the same manner with 5-liter portions of cold water, after which a sample washing should no longer be acid to Congo red. After drying over anhydrous magnesium sulphate, the chloroform is distilled off under reduced pressure (20 mm. or less), heating the distilling flask in a water bath at 40°. Under these conditions, the temperature inside the flask is below room temperature and very little decomposition will occur. The sticky residue is worked with 200 cc. of ethyl acetate until it becomes granular, is filtered off, and washed with ether until it is no longer sticky; about 1 liter in 200-cc. portions is required.

The sulphonyl chloride forms a yellow powder, M. P. 115–117°. Yield 470 g. (62.6%.)

EXAMPLE 2. — *2 - cyanoacetylcoumarone - 5 - sulphonyl chloride*

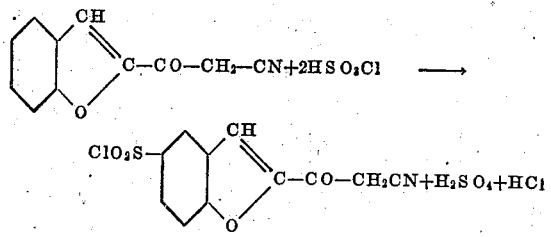

In a 3-liter, three-necked flask, fitted with an efficient mechanical stirrer and a thermometer, is placed 1250 cc. (about 19 moles) of chlorosulphonic acid. The flask is cooled in an ice-salt freezing mixture to about −10° C., and to the cold acid, in small portions with vigorous stirring, is added 500 g. (2.7 moles) of purified 2-cyanoacetylcoumarone. The rate of addition should be such that the temperature does not rise above +5° C.; about 30 minutes is required. When all the coupler has been added, the mixture is stirred at 0° for 2 hours and then at room temperature overnight, or for about 15 hours.

At the end of this time, the excess chlorosulphonic acid is decomposed by pouring the mixture with vigorous stirring onto 10 kg. of crushed ice, introducing the mixture simultaneously from two 1-liter dropping funnels. About 10 minutes is required for the decomposition. After being allowed to settle for a few minutes, the sulphonyl chloride is filtered off onto flannel, using two 12-inch Buchner funnels. The two cakes are combined, stirred with about 5 liters of ice-water, and again filtered off on a large funnel. The cake is again broken up, and stirred this time with an ice-cold solution of 500 g. of sodium acetate in 5 liters of water. Any lumps should be broken up as thoroughly as possible with a stick. The sulphonyl chloride is finally filtered off, washed on the funnel with about 5 liters of ice-water, and sucked dry. The final washings should not be acid to Congo red.

The cake, sucked as free as possible from water, is broken up and dissolved in 3 liters of ethyl acetate. The ethyl acetate solution is dried over anhydrous magnesium sulphate and the ethyl acetate is distilled off under reduced pressure (40–50 mm. Hg), the distilling flask being heated in a water bath which has a temperature no higher than 60°. Toward the end of the concentration the temperature should be as low as 20°. The inside temperature should never rise above 20°. The residue is stirred with 500 cc. of benzene, is filtered off, and washed on the filter with about 1 liter of ether. This washing removes a small amount of tarry impurity, which tends to make the product sticky, and leaves the sulphonyl chloride as a light-yellow powder which appears to be quite stable. The melting point of the pure material is 134–135°, but the product obtained from any particular run may melt as much as 10° lower and still be entirely satisfactory. In most cases the melting point was 130–132°.

The yield is about 250 g. (33%).

EXAMPLE 3.—*p-(ω-Benzoylacetamino)benzenesulphonyl chloride*

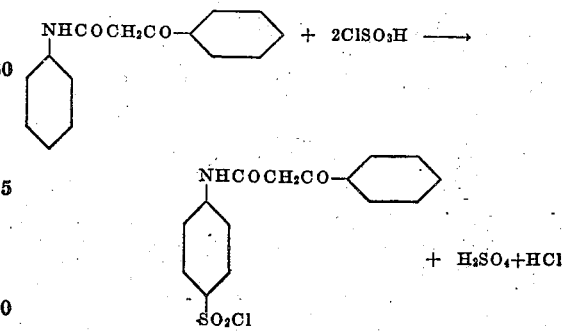

To 10 kg. (large excess) of chlorosulphonic acid cooled to 0–5° in an ice salt bath is added in small increments 2 kg. (8.35 moles) of benzoylacetanilide, while stirring vigorously. The temperature is kept below 10° by the occasional addition of dry ice. After all is added the ice bath is removed and the mixture stirred at room temperature for 4 hours. The reaction mixture is decomposed by adding in a thin stream to a vigorously stirred mixture of ice (a convenient amount for stirring in the receptacle used) and 500 cc. of concentrated hydrochloric acid. Ice (in all 30–40 kg. are used) is added throughout the decomposition so that the temperature is kept at about 5° or lower. After decomposition is complete, 5 liters of ethyl ether are added and the mixture is stirred for 15 minutes. On standing, the product floats to the top with the ether, and the bulk of the water solution may be drawn off. The product is then suction filtered, washed with 1 liter of water and then with 500 cc. of ether. After being sucked as dry as possible it is dried at room temperature for 40 hours, grinding it when possible. The product is then purified by extracting with benzene (20 l. in all) from which it crystallizes on cooling, after filtering the hot solution. Yield 1300–1500 g. (46.5–53.5%). M. P. 148–150°.

As stated above, these sulphonic acid chlorides of couplers may be reacted with amines to form sulphonamines or with alcohols or compounds containing a hydroxyl group to form esters. Sulphonamides which may be formed in this way are described in Vittum, Peterson, and Porter U. S. Patent 2,271,238, granted January 27, 1942, and sulphonic esters are described in Peterson U. S. Patent 2,289,804, granted July 14, 1942. Sulphonic ester couplers formed from sulphonyl chlorides of couplers are described in our U. S. Patent 2,289,805, granted July 14, 1942.

It is to be understood that the examples and reaction conditions described herein are illustrative only and that our invention is to be taken as limited only by the scope of the appended claims.

We claim:

1. The method of producing a sulphonic acid chloride of an aromatic compound containing a group selected from the class consisting of —CO—CH$_2$—CO— and CO—CH$_2$—CN, which comprises adding said aromatic compound slowly and in small portions to an excess of chlorosulphonic acid at a temperature not substantially above 10° C. and limiting the period of reaction to a time of a few days, to introduce a sulphonyl chloride group into only the aromatic ring portion of said compound.

2. The method of producing a sulphonic acid chloride of a benzoylacetamino-benzene which comprises adding said acetamino-benzene slowly and in small portions to an excess of chlorosulphonic acid at a temperature not substantially above 10° C. and limiting the period of reaction to a time of a few days, to introduce a sulphonyl chloride group into only the benzene ring portion of said acetamino-benzene.

3. The method of producing a sulphonic acid chloride of p-(ω-benzoylacetamino) benzene which comprises adding said acetamino-benzene slowly and in small portions to an excess of chlorosulphonic acid at a temperature not substantially above 10° C. and limiting the period of reaction to a time of a few days, to introduce a sulphonyl chloride group into only the benzene ring portion of said acetaminobenzene.

4. The method of producing a sulphonic acid chloride of an organic compound containing a cyanoacetyl group and an aromatic ring portion which comprises adding said organic compound slowly and in small portions to an excess of chlorosulphonic acid at a temperature not substantially above 10° C. and limiting the period of reaction to a time of a few days, to introduce a sulphonyl chloride group into only the aromatic ring portion of said organic compound.

5. The method of producing a sulphonic acid chloride of a 2-cyanoacetyl-coumarone which comprises adding a 2-cyanoacetyl-coumarone slowly and in small portions to an excess of chlorosulphonic acid at a temperature not substantially above 10° C. and limiting the period of reaction to a time of a few days, to introduce a sulphonyl chloride group into only the aromatic ring portion of said 2-cyanoacetyl-coumarone.

6. The method of producing a sulphonic acid chloride of a 2-cyanoacetyl-naphthalene which comprises adding said 2-cyanoacetyl naphthalene slowly and in small portions to an excess of chlorosulphonic acid at a temperature not substantially above 10° C. and limiting the period of reaction to a time of a few days, to introduce a sulphonyl chloride group into only the aromatic ring portion of said 2-cyanoacetylnaphthalene.

H. DUDLEY PORTER.
ARNOLD WEISSBERGER.